United States Patent [19]

Takada

[11] Patent Number: 4,934,734
[45] Date of Patent: Jun. 19, 1990

[54] INFLATABLE AIR BAG FOR PROTECTION OF A VEHICLE OCCUPANT

[76] Inventor: Juichiro Takada, No. 12-1 Shinmachi 3-Chome, Setagaya-ku, Tokyo, Japan

[21] Appl. No.: 328,837
[22] Filed: Mar. 27, 1989
[51] Int. Cl.⁵ .............................................. B61R 21/16
[52] U.S. Cl. .................................. 280/731; 280/742; 280/743
[58] Field of Search ............... 280/742, 743, 727, 728, 280/731, 740

[56] References Cited

U.S. PATENT DOCUMENTS

| | | | |
|---|---|---|---|
| 3,938,824 | 2/1976 | Patzelt | 280/743 |
| 3,960,386 | 6/1976 | Wallsten | 280/731 |
| 3,970,328 | 7/1976 | Wallsten | 280/731 |
| 4,003,588 | 1/1977 | Oka et al. | 280/743 |
| 4,169,613 | 10/1979 | Barnett | 280/742 |
| 4,173,356 | 11/1979 | Ross | 280/743 |
| 4,178,017 | 12/1979 | Ishi et al. | 280/742 |

Primary Examiner—Richard A. Bertsch
Attorney, Agent, or Firm—Brumbaugh, Graves, Donohue & Raymond

[57] ABSTRACT

An inflatable air bag for protection of a vehicle occupant by absorbing the secondary impact of the occupant as he or she is thrown forward by inertia comprises a fastening member at the gas inflow side, a fastening member at the impact side and a plurality of inflation-controlling members connected between the fastening members and forming junctures therewith. Each inflation-controlling member is arranged such that the internal stress caused by an impact tensile load is smaller at the junctures between it and the respective fastening members than is the internal stress in any portion of the inflation-controlling members between said junctures.

2 Claims, 6 Drawing Sheets

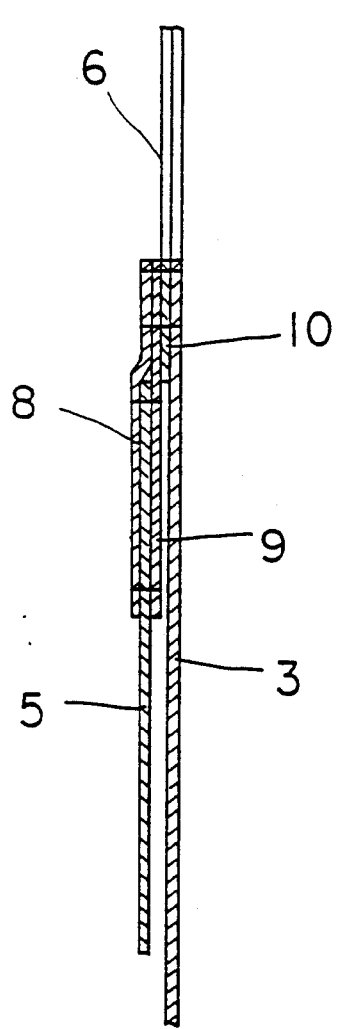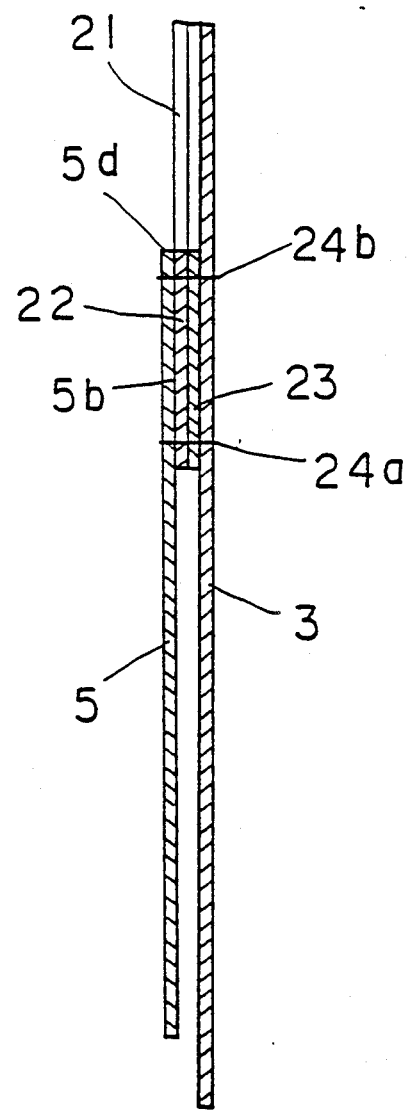
FIG. 5
FIG. 7

INFLATABLE AIR BAG FOR PROTECTION OF A VEHICLE OCCUPANT

FIELD OF THE INVENTION

The present invention relates to an air bag which is normally folded into a compartment, such as a box within the steering wheel hub, in the dashboard on the passenger side, or in the rear of a front seat, and which inflates virtually instantaneously in a collision and absorbs the secondary impact of the occupant as he or she is thrown forward by inertia.

BACKGROUND OF THE INVENTION

FIG. 1 is a schematic side view of a known air bag system 50 as installed in a compartment of the hub of a steering wheel 51, and FIG. 2 is a developmental view of parts of the interior of the air bag 52. In the event of a collision, an inflator (not shown) releases a gas rapidly into the air bag 52, thereby inflating it. It is known that there are advantages to having the bag assume a somewhat flattened, thick disc-like shape at the completion of filling and to provide inflation-controlling members 53 within the air bag to establish the desired shape. The members, which are usually fabric bands connected between the center of the gas filling side and the center of the impact side of the bag 52, hold the center of the impact side at a fixed distance from the inflator so that the gas is deflected laterally to fill the bag perimeter 52A. The thick disc-like shape best protects the occupant as he or she is thrown forward.

In a known arrangement, four equally spaced-apart inflation-controlling straps 53 (only one is shown in FIG. 2) are joined to a fastening member 55A by stitching 56A, and the member 55A is stitched to the air bag 52 around the gas inlet opening 54. The fastening member 55A, in addition to providing for attachment of the straps 53, reinforces the air bag 52 in the region where it is attached to the inflator. Holes 57 are punched in the bag 52 and the fastening member 55A for fasteners that attach the air bag to the inflator. Similarly, an annular fastening member 55B provides for attachment of the straps 53 to the impact side of the bag 52 and reinforces the bag in the attachment region. The straps 53, fastening member 55B and the bag 52 are stitched together by three concentric circular rows of stitches 56B.

When the air bag 52 is inflated, the gas jet is directed against the center part of the impact side, which is propelled rapidly toward the occupant until its movement is arrested by the inflation-controlling members 53. Stopping the movement of the center part of the impact side of the bag imposes high impact tensile forces on the members 53. Those forces produce high degrees of stress concentration in the portions of the straps where they join the fastening members 55A and 55B, namely, the areas indicated by the arrows "a" and "b" in FIG. 2. Accordingly, there is some chance that the inflation-controlling members 53 will separate from one or the other of the fastening members 55A and 55B along the stitching 56A or 56B, thereby allowing the bag to fill in an undesired way and possibly attain a less than optimum shape.

SUMMARY OF THE INVENTION

An object of the present invention is to provide inflation-controlling members in an air bag that will not separate from the fastening members and thereby ensure that the air bag will fill properly and have the desired shape at the end of development. As a result, the vehicle occupant will be properly protected from a secondary collision resulting from an accident.

There is provided, according to the invention, an inflatable air bag for protection of a vehicle occupant by absorbing the secondary impact of the occupant as he or she is thrown forward by inertia and having a fastening member at the gas inflow side, a fastening member at the impact side and a plurality of inflation-controlling members connected between the fastening members and forming junctures therewith. The invention is characterized in that each inflation-controlling member is arranged such that the internal stress caused by an impact tensile load is smaller at the junctures between it and the respective fastening members than is the internal stress in any portion of the inflation-controlling members between said junctures.

A preferred embodiment of the air bag, according to the invention, is further characterized in that each of the inflation-controlling members is a flexible, substantially non-extensible band of material having a medial portion of generally uniform width and portions at each end forming said junctures that are substantially wider than the medial portion, whereby the member is of generally dogbone shape.

When the gas is introduced from the inflator into the interior of the air bag at the time of an accident, it impinges mainly against the center part of the occupant impact side of the air bag and is deflected and disbursed radially throughout the air bag. After partial inflation of the air bag, movement of the occupant impact side is arrested by the inflation-controlling members. At that time, a high impact or dynamic tensile load is imposed on the inflation-controlling members. The internal tensile stress in the inflation-controlling members caused by the impact tensile load is lower at the junctures between each of the inflation-controlling members and each of the fastening members than the internal stress in any portion between the junctures. Accordingly, separation of the inflation-controlling members from the aforesaid junctures with the fastening members is prevented.

A preferred embodiment of the invention is described below with reference to the accompanying drawings.

DESCRIPTION OF THE DRAWINGS

FIG. 5 is a partial cross-sectional view of the gas-filling side taken along the line I—I of FIG. 4;

FIG. 7 is a partial cross-sectional view of the occupant impact side taken along the line II—II of FIG. 6.

DESCRIPTION OF THE EMBODIMENT

Figure 1:
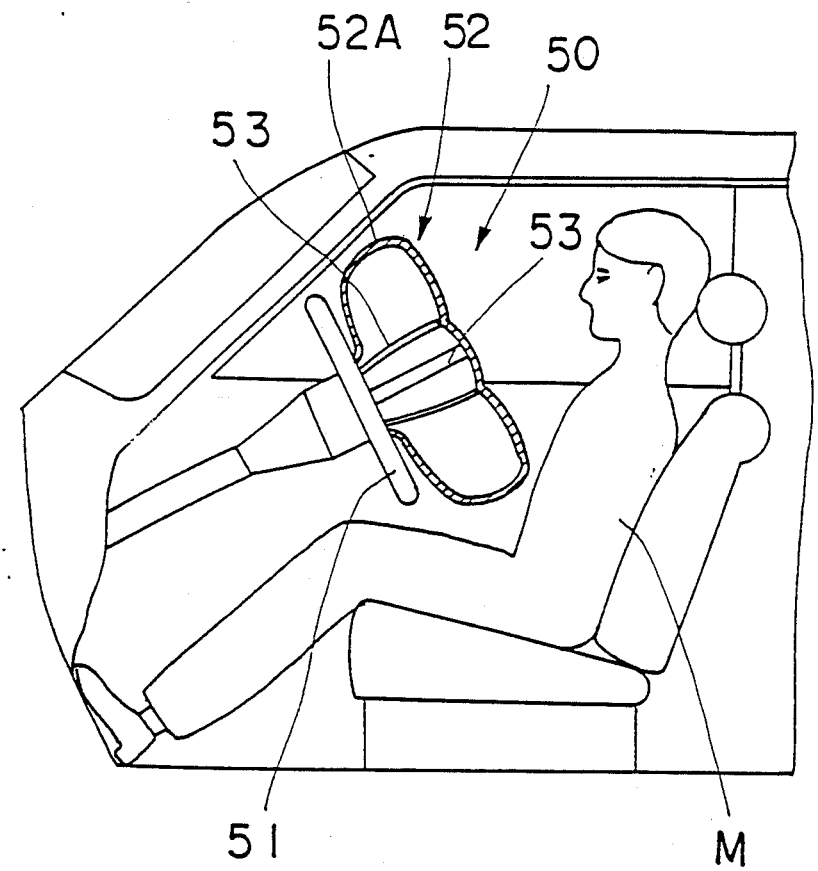
FIG. 1 (described above) is a generally diagrammatic side elevational view of a prior art air bag system installed in a vehicle and shows the air bag inflated and in cross-section.
Figure 2:
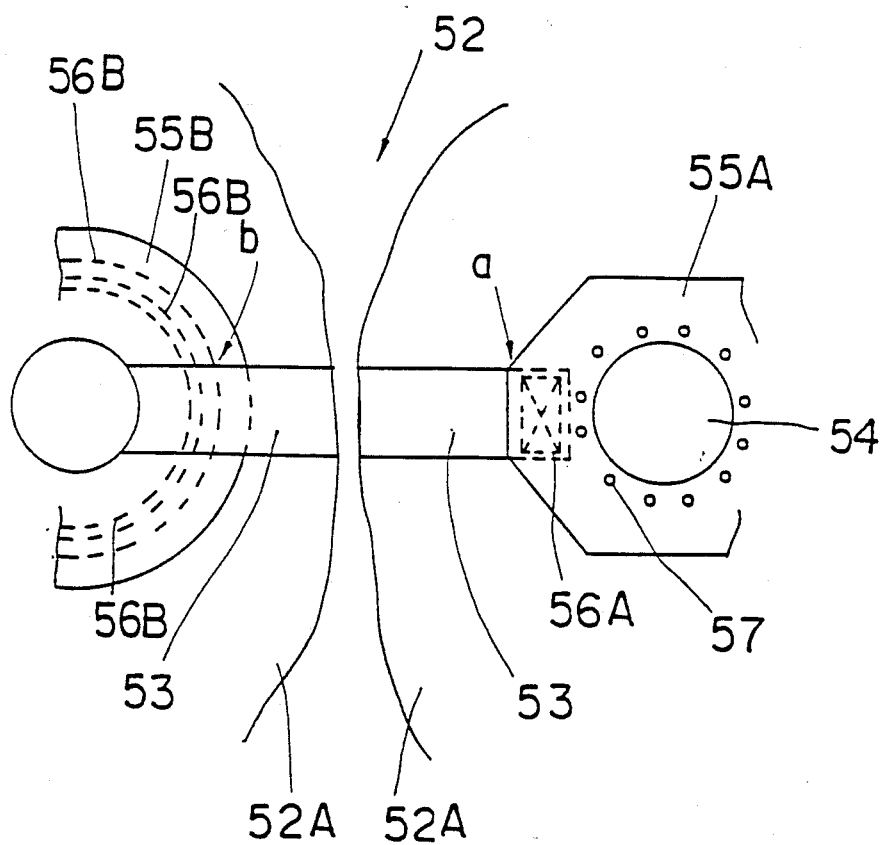
FIG. 2 is a developmental plan view of portions of the inside of a prior art air bag.

The air bag 1 comprises an air bag body 3 having the same structure as the conventional air bag body 52A of FIG. 1, two fastening members 4A, 4B connected at the gas inflow side G1 of the air bag body 3 and at the occupant impact side G2, respectively, and six inflation-controlling members 5 attached between the two fastening members 4A, 4B.

Figure 4:
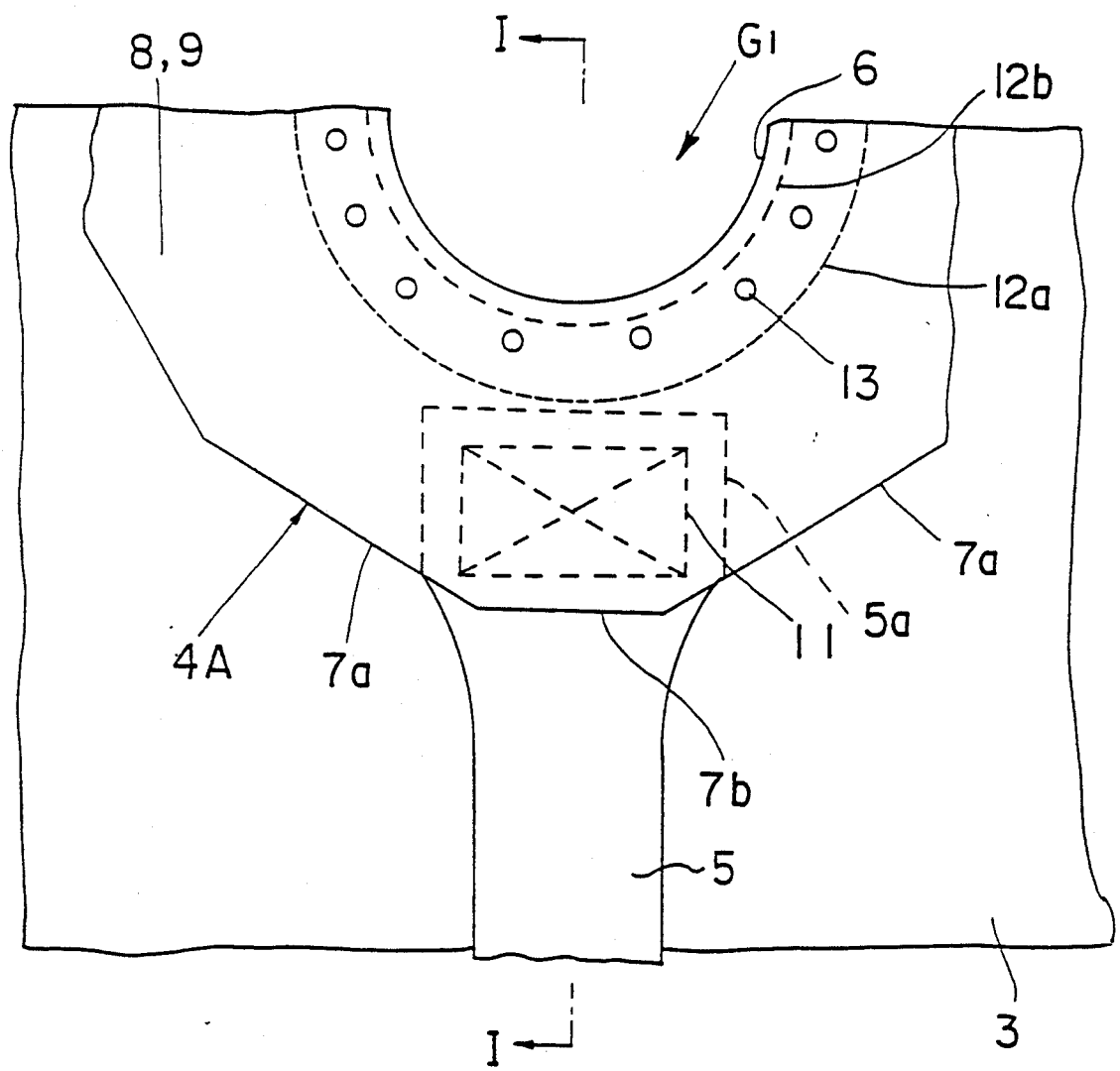
FIG. 4 is a partial plan view of the interior aspect of the gas-filling side of the air bag.

As shown in FIG. 4, the fastening member 4A at the gas inflow side G1 has a gas inflow opening 6 that is coincident with a circular opening in the air bag body 3. The fastening member 4A is, as shown in FIGS. 4 and 5, composed of a first fabric sheet 8 and a second fabric sheet 9. The perimeters of the sheets 8 and 9 form a modified dodecagonal profile having six longer sides 7a and six shorter sides 7b which adjoin each other alternately. The fastening member also includes an annular fabric disc 10.

A rectilinear end portion 5a formed at one end of each of the six inflation-controlling members 5 is inserted radially toward the gas inflow opening 6 from one shorter side 7b between the first and second fabric sheets 8, 9. The first sheet 8, the end 5a and the second sheet 9 are stitched to each other along stitch lines 11 forming a rectangle and two diagonals. The first and second sheets 8, 9, the disc 10 and the air bag body 3 are stitched to each other adjacent the gas inflow opening 6 by the two circular stitche lines 12a and 12b. The space between the seams 12a and 12b is provided with holes 13 in a circle for receiving the fasteners that connect an inflator (not illustrated) to the air bag. For simplification of the drawings, only one inflation-controlling member 5 is shown in FIG. 4. Each of the members 5 is joined at a respective shorter edge 7b to the fastening member 4A.

Figure 3:
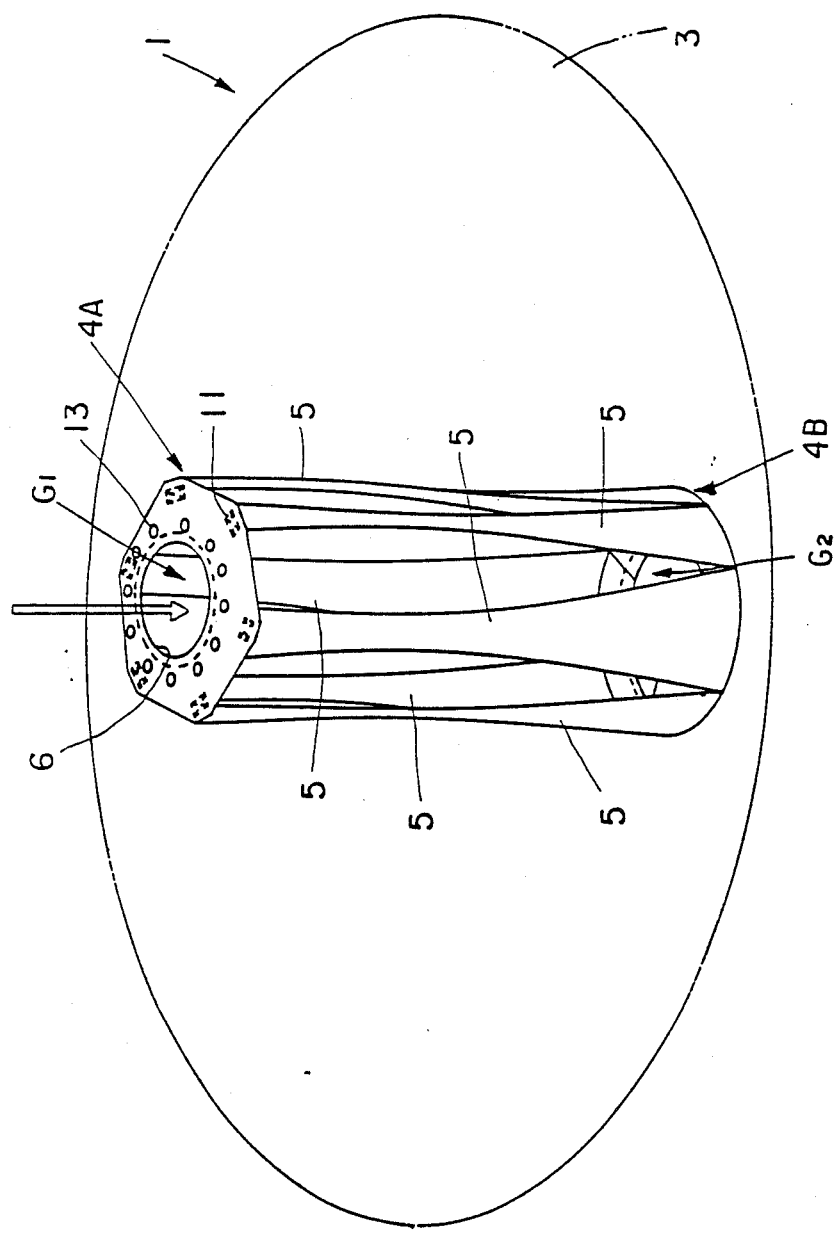
FIG. 3 is a generally representational pictorial view of an air bag embodying the invention in a filled condition.

As shown in FIG. 3, each of the six inflation-controlling members 5 is narrower along most of its length and wider at both ends, i.e. at the junctures with the fastening members 4A, 4B; it has the general shape of a dogbone. Each inflation-controlling member 5 has curved edges adjacent to the widened ends to prevent stresses concentrations and redistribute the internal stress gradually.

Figure 6:
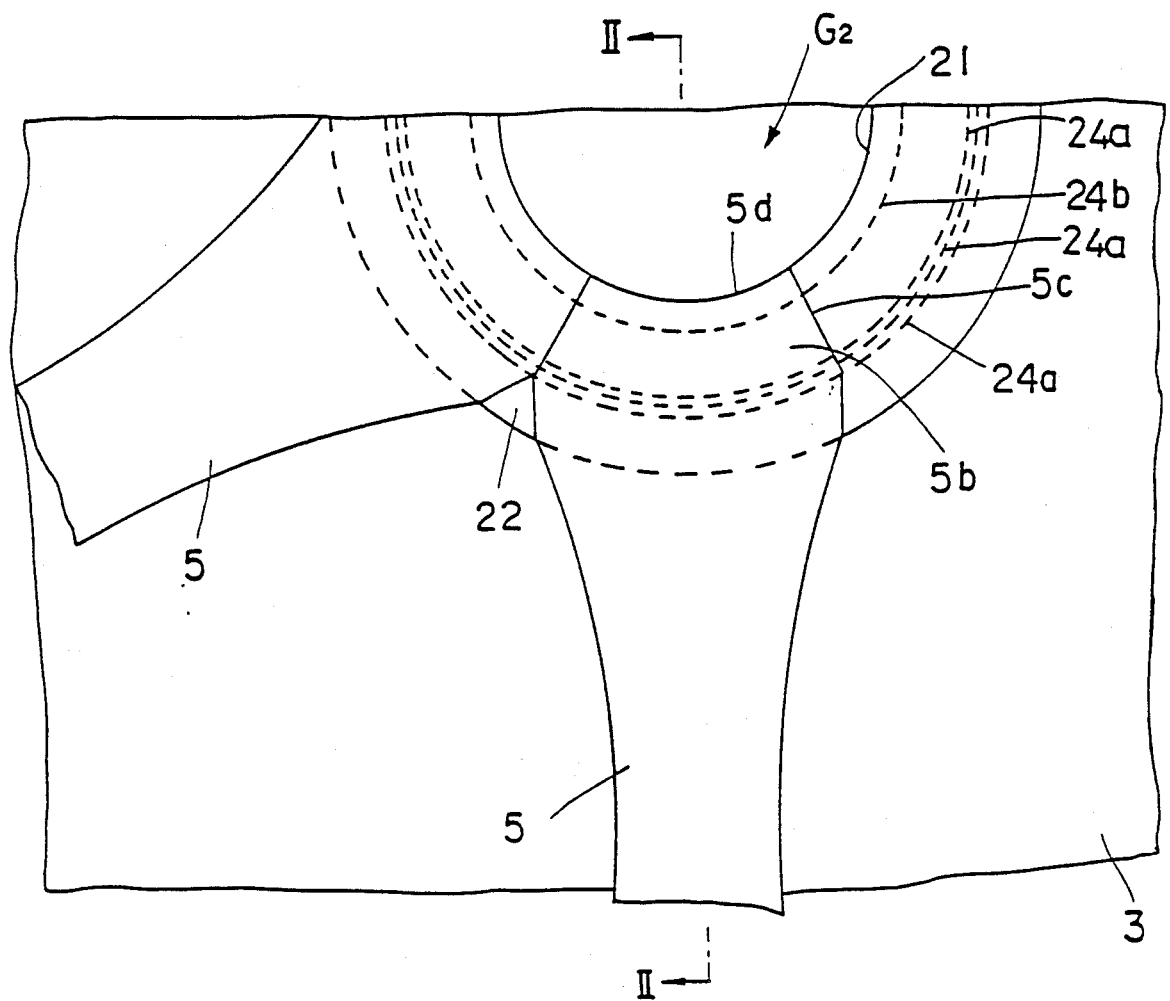
FIG. 6 is a partial plan view of the interior aspect of the occupant impact side of the air bag.

FIGS. 6 and 7 show the fastening member 4B at the occupant impact side G2. It has a circular opening 21 concentric to the geometric center of the occupant impact side G2 of the air bag and consists of a third fabric sheet 22 and a fourth fabric sheet 23, both of which are annular. The six end portions 5b of the six inflation-controlling members 5 are configured such that the respective edges 5c of adjacent members 5 abut each other. Each end portion 5b of the six members 5, the third and fourth fabric sheets 22, 23 and the air bag body 3 are stitched together along two circular stitch lines 24a, 24b. An edge 5d of each inflation-controlling member 5 is cut off along an arc so as to be concurrent with the circular opening 21.

The operation of the air bag is as follows. In a vehicle crash, the gas is introduced into the interior of the air bag 1 from the inflator (not illustrated), i.e., in the direction of the arrow shown in FIG. 3. The gas flows rapidly from the gas inflow side G1 toward the occupant impact side G2, impinges against the occupant impact side G2 and is deflected and dispersed generally radially throughout the air bag body 3. When the inflation-controlling members 5 are fully extended (FIG. 1), they are placed under a high impact or dynamic tension generated when they stop the rapidly moving occupant impact side wall of the bag abruptly. At this point inflation of the center part of the air bag body 3 is restricted by the inflation-controlling center part of the members 5. Accordingly, just like the conventional air bag, the air bag 1 assumes an optimum shape for cushioning the occupant against the secondary impact.

Although a certain internal stress caused by the tensile load in connection with the inflation of the air bag body 3 is imposed upon each inflation-controlling member 5, as discussed above, each inflation-controlling member 5, because of its dogbone shape, is subject to an impact internal tensile stress that is larger in the narrow central part but smaller in the portions that form the junctures with the two fastening members 4A, 4B. Accordingly, by providing a tensile strength for the middle portion of each member 5 sufficient to endure the impact force of arresting the occupant impact side of the air bag, separation of the inflation-controlling members 5 is prevented, and the air bag body 3 inflates to an optimum shape.

I claim:

1. An inflatable air bag for protection of a vehicle occupant by absorbing the secondary impact of the occupant as he or she is thrown forward by inertia and having a fastening member at the gas inflow side, a fastening member at the impact side and a plurality of inflation-controlling members connected between the fastening members and forming junctures therewith, characterized in that each inflation-controlling member is a band of material that is substantially wider at and adjacent to the junctures than at any portion intermediate the junctures such that the internal stress caused by an impact tensile load is smaller at the junctures between it and the respective fastening members than is the internal stress in any portion of the inflation-controlling members between said junctures.

2. An air bag according to claim 1 and further characterized in that each of the inflation-controlling members has a medial portion of generally uniform width and portions at each end forming said junctures that are substantially wider than the medial portion, whereby the member is of generally dogbone shape.

* * * * *